(12) United States Patent
Garito et al.

(10) Patent No.: US 7,130,517 B2
(45) Date of Patent: Oct. 31, 2006

(54) ATHERMAL POLYMER OPTICAL WAVEGUIDE ON POLYMER SUBSTRATE

(75) Inventors: Anthony Garito, Radnor, PA (US);
Renyuan Gao, Wayne, PA (US);
Renfeng Gao, Phoenixville, PA (US);
Yu-Ling Hsiao, Collegeville, PA (US);
Kazuya Takayama, Phoenixville, PA (US); Aydin Yeniay, Wayne, PA (US)

(73) Assignee: Photon X, LLC, Malvern, PA (US)

( * ) Notice: Subject to any disclaimer, the term of this patent is extended or adjusted under 35 U.S.C. 154(b) by 13 days.

(21) Appl. No.: 10/243,833

(22) Filed: Sep. 16, 2002

(65) Prior Publication Data

US 2003/0123828 A1 Jul. 3, 2003

Related U.S. Application Data

(60) Provisional application No. 60/364,027, filed on Mar. 15, 2002, provisional application No. 60/359,345, filed on Feb. 25, 2002, provisional application No. 60/322,162, filed on Sep. 14, 2001.

(51) Int. Cl.
*G02B 6/10* (2006.01)

(52) U.S. Cl. .................. 385/129; 385/130; 385/131

(58) Field of Classification Search ........ 385/129–132, 385/141–145
See application file for complete search history.

(56) References Cited

U.S. PATENT DOCUMENTS 6,292,292 B1* 9/2001 Garito et al. ............ 359/341.5
6,778,753 B1* 8/2004 Blomquist ................. 385/143
2003/0038251 A1* 2/2003 Livesay et al. ........... 250/492.3

FOREIGN PATENT DOCUMENTS

| DE | 199 04 304 A1 | 8/2000 |
|---|---|---|
| WO | WO 01/61797 A1 | 8/2001 |
| WO | WO 01/61802 A2 | 8/2001 |
| WO | WO 01/61803 A2 | 8/2001 |

OTHER PUBLICATIONS

Eldada et al, Advances in Polymer Integrated Optics, Jan./Feb. 2000, IEEE Journal of Selected Topics in Quantum Electronics, vol. 6, No. 1, pp. 54-68.*
Keil et al., "Athermal all-polymer arrayed-waveguide grating multiplexer," Electronics Letters (Apr. 26, 2001), 37:579-580.
Ando et al., "Perfluorinated polymers for optical waveguides," Chemtech (Dec. 1, 1994), 24:20-27.

* cited by examiner

*Primary Examiner*—Juliana Kang
(74) *Attorney, Agent, or Firm*—Min, Hsieh & Hack LLP

(57) ABSTRACT

A planar optical waveguide is provided. The planar optical waveguide includes a polymer substrate having a coefficient of thermal expansion, a first cladding disposed on the substrate, and a core disposed on at least a portion of the first cladding. The core is a halogenated polymer having an absorptive optical loss of less than approximately $2.5 \times 10^{-4}$ dB/cm in the range from about 1250 to 1700 nm. The core has a thermo-optic coefficient and a refractive index, a product of the thermo-optic coefficient and the reciprocal of the refractive index being approximately equal to the negative of the coefficient of thermal expansion.

2 Claims, 11 Drawing Sheets

Measured temperature dependence of AWG channel wavelength shift (a) without superstrate (-------) and (b) with superstrate (_____).

ATHERMAL POLYMER OPTICAL WAVEGUIDE ON POLYMER SUBSTRATE

CROSS-REFERENCE TO RELATED APPLICATION

This application claims the benefit of U.S. Provisional Applications 60/322,162 filed Sep. 14, 2001; 60/359,345 filed Feb. 25, 2002; and 60/364,027 filed Mar. 15, 2002.

FIELD OF THE INVENTION

The present invention relates to planar optical waveguides using polymer substrates and polymer waveguide materials.

BACKGROUND OF THE INVENTION

Planar optical waveguides can be formed in polymers by using a core polymer and a cladding polymer with the core polymer refractive index slightly higher than that of the cladding polymer across the near infrared region of the optical telecommunication window from approximately 1200 to 1700 nanometers. A general approach to making such polymer optical waveguides is to dispose an undercladding polymer film layer on a silicon substrate and then a polymer core layer on top of the undercladding layer. The polymer core layer subsequently undergoes patterning, such as by lithography and etching processes, from which a rectangular cross-section channel is formed. An overcladding polymer film layer is then disposed on top of the waveguide core and the exposed undercladding film layer.

Various optical devices such as integrated splitters, couplers, arrayed waveguide gratings, and optical waveguide amplifiers can be formed with optical waveguides. In phase sensitive optical waveguide devices, such as directional couplers, Mach-Zender interferometers, arrayed waveguide gratings (AWG), etc., the wavelength responses of the devices vary significantly with environmental temperature changes, as shown in FIG. 1. This variance is due to the large thermal expansion coefficient and the large optic coefficient of polymer materials. Due to these large coefficients, operation of these optical waveguide devices requires temperature control, thereby increasing device complexity and manufacturing cost.

Keil et al. "Athermal all-polymer arrayed-waveguide grating multiplexer," Electronics Letters, Vol. 37, No. 9, Apr. 26, 2001, have disclosed fluoroacrylate-type polymers such as a terpolymer of pentafluorostyrene, trifluoroethylmethacrylate, and glycidylmethacrylate disposed on a polymer substrate as AWG's. However, these fluoroacrylate-type polymers contain numerous C—H bonds. Polymers with C—H bonds typically have high absorption in the infrared region where the optical communication signals reside, at approximately 1.5 μm. This absorption causes optical communication signal loss.

Suh et al. U.S. Pat. No. 6,100,371, disclose using a polyimide polymer. However, polyimides disclosed by Matsuura et al. contain numerous C═O bonds.

Joo-Heon Ahn et al. "Polymeric 1×8 Arrayed Waveguide Grating Multiplexer using Fluorinated Poly(ether ketone) at 1550 nm," Proceedings of SPIE, Terahertz and Gigahertz Photonics, Vol. 3795, pg. 568–575, Denver, Colo. (July 1999), disclose a waveguide grating having a silicon substrate and use synthesized polyetherketone as the core material.

It is desirable to have polymer waveguide devices that are intrinsically athermal, i.e., the wavelength responses of the devices are have reduced sensitivity to environmental temperature changes, but exhibit low absorption loss around the 1.5 μm infrared communication wavelength, as well as exhibit a reduced amount of birefringence.

BRIEF SUMMARY OF THE INVENTION

Briefly, the present invention provides a planar optical waveguide. The planar optical waveguide comprises a polymer substrate, a first cladding disposed on the substrate, and a core disposed on at least a portion of the first cladding. The core is a halogenated polymer having an absorptive optical loss of less than approximately $2.5 \times 10^{-4}$ dB/cm in the range from about 1250 to 1700 nm.

In an embodiment there is a planar optical waveguide comprising a polymer substrate, a first cladding disposed on the substrate, and a core disposed on at least a portion of the first cladding. The core is a halogenated polymer and the halogenated polymer is substantially free from C═O bonds.

In another embodiment there is a planar optical waveguide comprising a polymer substrate, a first cladding disposed on the substrate, and a core disposed on at least a portion of the first cladding. The core is a halogenated polymer substantially free from polyimides and acrylates.

In another embodiment there is a planar optical waveguide comprising a polymer substrate having a coefficient of thermal expansion, a first cladding disposed on the substrate, and a core disposed on at least a portion of the first cladding. The core is a halogenated polymer having a birefringence of less than or equal to about 0.001. The core has an absorptive optical loss of less than approximately $2.5 \times 10^{-4}$ dB/cm in the range from about 1250 to 1700 nm. The core has a thermo-optic coefficient and a refractive index, a product of the thermo-optic coefficient and the reciprocal of the refractive index being approximately equal to the negative of the coefficient of thermal expansion.

In another embodiment there is a planar optical waveguide comprising a polymer substrate having a coefficient of thermal expansion, a first cladding disposed on the substrate, and a core disposed on at least a portion of the first cladding. The core is a halogenated polymer substantially free from C═O bonds. The core has a thermo-optic coefficient and a refractive index, a product of the thermo-optic coefficient and the reciprocal of the refractive index being approximately equal to the negative of the coefficient of thermal expansion.

In another embodiment there is a planar optical waveguide comprising a polymer substrate having a coefficient of thermal expansion, a first cladding disposed on the substrate, and a core disposed on at least a portion of the first cladding. The core is a halogenated polymer excluding polyimides and acrylates. The core has a thermo-optic coefficient and a refractive index, a product of the thermo-optic coefficient and the reciprocal of the refractive index being approximately equal to the negative of the coefficient of thermal expansion.

Further, a method of manufacturing a planar optical waveguide is disclosed. The waveguide has a substrate and a halogenated polymer waveguide core material having an absorptive optical loss of less than approximately $2.5 \times 10^{-4}$ dB/cm in the range from about 1250 to 1700 nm. The method comprises providing the waveguide core material; determining a thermo-optic coefficient and a refractive index of the waveguide core material; selecting a substrate material having a coefficient of thermal expansion approximately equal to the negative of the product of the thermo-optic coefficient and the reciprocal of the refractive index of the waveguide core material; forming the substrate from the substrate material; depositing a first cladding layer onto the substrate; depositing the waveguide core material onto the substrate; and forming a waveguide core from the waveguide core material.

In another embodiment there is a method of manufacturing a planar optical waveguide where the waveguide has a substrate and a halogenated polymer waveguide core material having an absorptive optical loss of less than approximately $2.5 \times 10^{-4}$ dB/cm in the range from about 1250 to 1700 nm. The method comprises providing a substrate having a coefficient of thermal expansion; selecting the waveguide material having a thermo-optic coefficient and a refractive index of the waveguide core material such that the coefficient of thermal expansion is approximately equal to the negative of the product of the thermo-optic coefficient and the reciprocal of the refractive index of the waveguide core material; depositing a first cladding layer onto the substrate; depositing the waveguide core material onto the substrate; and forming a waveguide core from the waveguide core material.

In another embodiment there is a method of manufacturing a planar optical waveguide where the waveguide has a substrate and a halogenated polymer waveguide core material being a halogenated polymer substantially free from C=O bonds. The method comprises providing the waveguide core material; determining a thermo-optic coefficient and a refractive index of the waveguide core material; selecting a substrate material having a coefficient of thermal expansion approximately equal to the negative of the product of the thermo-optic coefficient and the reciprocal of the refractive index of the waveguide core material; forming the substrate from the substrate material; depositing a first cladding layer onto the substrate; depositing the waveguide core material onto the substrate; and forming a waveguide core from the waveguide core material.

In another embodiment there is a method of manufacturing a planar optical waveguide where the waveguide has a substrate and a halogenated polymer waveguide core material being a halogenated non-birefringent polymer substantially free from C=O bonds. The method comprises providing a substrate having a coefficient of thermal expansion; selecting the waveguide material having a thermo-optic coefficient and a refractive index of the waveguide core material such that the coefficient of thermal expansion is approximately equal to the negative of the product of the thermo-optic coefficient and the reciprocal of the refractive index of the waveguide core material; depositing a first cladding layer onto the substrate; depositing the waveguide core material onto the substrate; and forming a waveguide core from the waveguide core material.

In another embodiment there is a planar optical waveguide comprising a polymer substrate having a coefficient of thermal expansion, a first cladding disposed on the substrate, and a core disposed on at least a portion of the first cladding. The core is a halogenated polymer having an absence of deleterious vibrational overtones between approximately 1200 and 1700 nanometers. The core has a thermo-optic coefficient and a refractive index, a product of the thermo-optic coefficient and the reciprocal of the refractive index being approximately equal to the negative of the coefficient of thermal expansion.

In another embodiment there is a planar optical waveguide comprising a polymer substrate having a coefficient of thermal expansion, a first cladding disposed on the substrate, and a core disposed on at least a portion of the first cladding. The core is a halogenated polymer having a transmission of about 95% or more per centimeter between approximately 1200 and 1700 nanometers. The core has a thermo-optic coefficient and a refractive index, a product of the thermo-optic coefficient and the reciprocal of the refractive index being approximately equal to the negative of the coefficient of thermal expansion.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain the features of the invention. In the drawings.

DETAILED DESCRIPTION OF THE INVENTION

Figure 1:
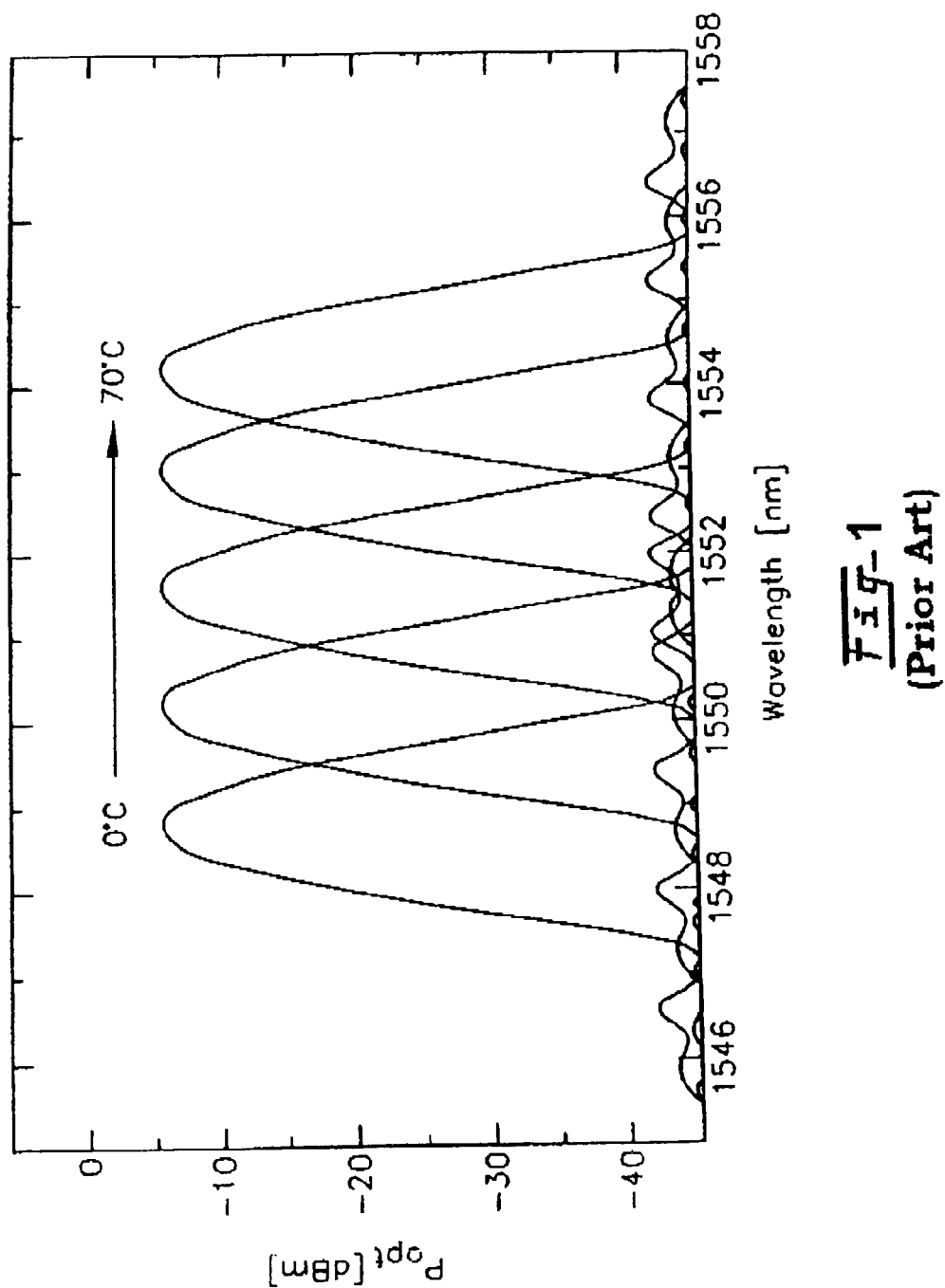
FIG. 1 is a graph showing wavelength shift as a function of temperature for an optical waveguide constructed according to the prior art.

In the drawings, like numerals indicate like elements throughout. Co-pending U.S. patent application Ser. No. 10/045,317, filed on 7 Nov. 2001, and U.S. Patent Application No. 60/322,163, filed on 14 Sep. 2001, both owned by the assignee of the present invention, are both incorporated herein by reference in their entireties. Also incorporated by reference in its entirety is U.S. Provisional Patent Application No. 60/364,027 filed on 15 Mar. 2001, owned by the assignee of the present invention.

Polymers to be used as optical waveguide material should have low absorption loss in the range of telecommunication wavelengths (1200 nm~1700 nm). C—H bonds in the typical organic polymers exhibit a large vibrational overtone absorption near the C-band telecommunication range band (between 1530 nm and 1565 nm). One method to eliminate optical loss is to replace the C—H bonds with C—F bonds, which shifts the vibrational overtones toward longer wavelength leaving a low loss optical window in the C-band. However, to push the performance of the optical polymer to exhibit a waveguide loss of less than or approximately 0.1 dB/cm across the telecommunication range, it is necessary to minimize the presence of other functional groups, which contribute to additional absorption losses. For example, the presence of O—H and C=O bonds in the polymer also contribute to the fundamental optical loss (see Table 1).

TABLE 1

Wavelengths and intensities of some important vibrational overtones

| Bond | N | Wavelength (nm) | Intensity (relative) |
|------|---|-----------------|----------------------|
| C—H  | 1 | 3390 | 1 |
| C—H  | 2 | 1729 | $7.2 \times 10^{-2}$ |
| C—H  | 3 | 1176 | $6.8 \times 10^{-3}$ |
| C—F  | 5 | 1626 | $6.4 \times 10^{-6}$ |
| C—F  | 6 | 1361 | $1.9 \times 10^{-7}$ |
| C—F  | 7 | 1171 | $6.4 \times 10^{-9}$ |
| C=O  | 3 | 1836 | $1.2 \times 10^{-2}$ |
| C=O  | 4 | 1382 | $4.3 \times 10^{-4}$ |
| C=O  | 5 | 1113 | $1.8 \times 10^{-5}$ |
| O—H  | 2 | 1438 | $7.2 \times 10^{-2}$ |

Similarly, functional groups such as Si—H, S—H, N—H, P—H, C=N, C=C, C=S, N=O, C≡N, and C≡C, with their fundamental vibrational frequencies above 1400 cm$^{-1}$, also exhibit undesirable vibrational overtones extending into the telecommunication wavelength range.

In addition to low absorption requirements in polymer waveguide materials, optical polymers for AWGs should also exhibit very low polarization dependence so that the polarization dependent losses and polarization dependent shifts in the filter performance are minimized. The polarization dependence property of the polymer waveguide materials is directly related to the birefringence property of these polymers. Birefringence is the difference in the refractive indexes in the two directions perpendicular to the direction of optical propagation. The birefringence may derive from either inherent material properties or it can be induced by means of externally applied force fields. Polyimide type polymers, containing aromatic rings in the main chain, generally exhibit a large birefringence which make them undesirable as optical waveguide materials.

Figure 2:
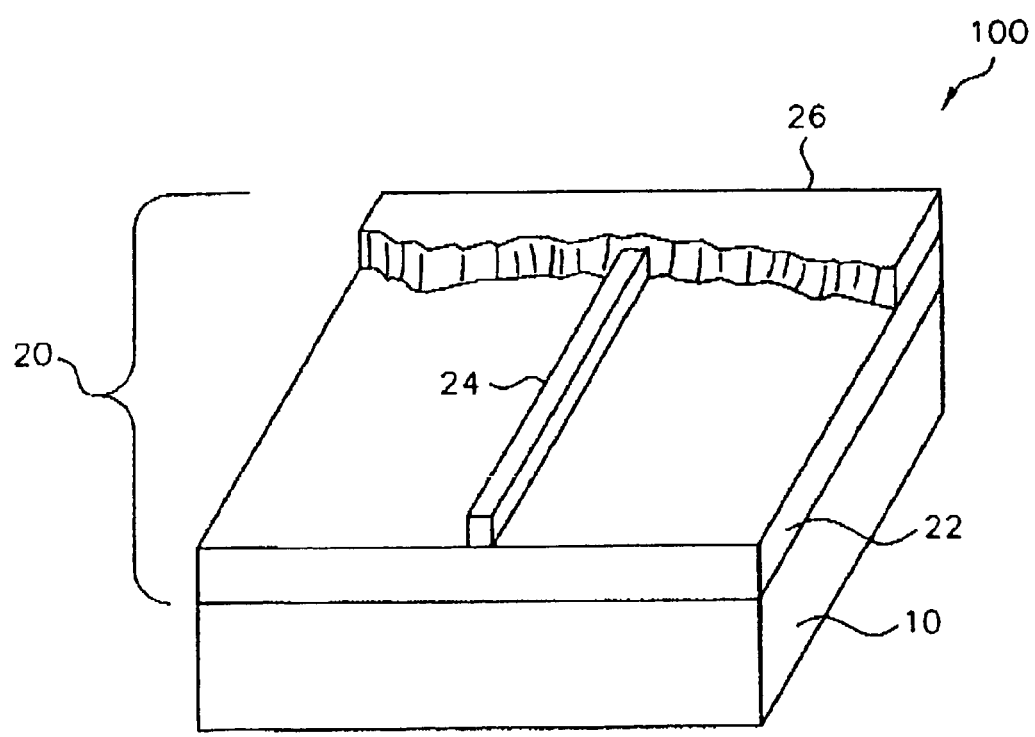
FIG. 2 is a perspective view of a planar optical waveguide constructed according to a first embodiment of the present invention.

Referring to FIG. 2, an optical waveguide assembly 100 is comprised of a polymer substrate 10 with a polymer optical waveguide 20 disposed on substrate 10. The waveguide 20 is comprised of a lower cladding 22, a core 24 disposed on at least a portion of the lower cladding 22, and an upper cladding 26 disposed on core 24 and a remaining portion of lower cladding 22.

In an embodiment, substrate 10 is selected from the group consisting of polycarbonate, acrylic, polymethyl methacrylate, cellulosic, thermoplastic elastomer, ethylene butyl acrylate, ethylene vinyl alcohol, ethylene tetrafluoroethylene, fluorinated ethylene propylene, polyetherimide, polyethersulfone, polyetheretherketone, polyperfluoroalkoxyethylene, nylon, polybenzimidazole, polyester, polyethylene, polynorbornene, polyimide, polystyrene, polysulfone, polyvinyl chloride, polyvinylidene fluoride, an ABS polymer (such as polyacrylonitrile butadiene styrene), acetal copolymer, poly[2,2-bistrifluoromethyl-4,5-difluoro-1,3-dioxole-co-tetrafluoroethylene], poly[2,3-(perfluoroalkenyl) perfluorotetrahydrofuran], poly[2,2,4-trifluoro-5-trifluoromethoxy-1,3-dioxole-co-tetrafluoroethylene], and any other thermoplastic polymers, and thermoset polymers, such as diallyl phthalate, epoxy, furan, phenolic, thermoset polyester, polyurethane, vinyl ester, Ticona's liquid crystal polymer, polycohydroxybenzoate-hydroex naphthoate. However, those skilled in the art will recognize that other polymers can be used. A substrate 10 manufactured from any of the above-listed polymers or combinations or blends of the above-listed polymers exhibit thermal properties conducive to providing an athermal polymer waveguide assembly 100.

In another embodiment substrate 10 includes a modified surface that allows lower cladding 22 to sufficiently adhere to substrate 10. The substrate 10 is modified by reactive ion etching (RIE) the surface of substrate 10 with a gas, such as oxygen or argon. A detailed description of the etching process is disclosed in U.S. patent application Ser. No. 10/045,317, filed on 7 Nov. 2001, which is owned by the assignee of the present invention and incorporated herein by reference in its entirety. While not intending to be limited to any particular theory, it is believed that the gas used in the process removes impurities and contaminants, such as organic materials and adhesives, from the surface of substrate 10, thereby "cleaning" the surface of substrate 10. Again, while not intending to be limited to any particular theory, it is also believed that the argon physically deforms and roughens the surface of substrate 10, forming peaks and valleys in the surface, and allowing the lower cladding 22 to "grip" substrate 10. Again, while not intending to be limited to any particular theory, it is also believed that the oxygen, in addition to physically deforming and roughening the surface of the substrate similar to the argon, also oxygenates the surface to enhance adhesion between the substrate 10 and the lower cladding 22. Adhesion testing indicates that substrates 10 that are modified provide significantly better adhesion than unmodified substrates.

In another embodiment, lower cladding 22 is a polymer, in another embodiment lower cladding 22 is a halogenated polymer such as a fluoropolymer, and in certain embodiments, lower cladding 22 is a perhalogenated polymer such as a perfluoropolymer including a perfluoropolymer from the group consisting of poly[2,2-bistrifluoromethyl-4,5-difluoro-1,3-dioxole-co-tetrafluoroethylene], poly[2,3-(perfluoroalkenyl) perfluorotetrahydrofuran], and poly[2,2,4-trifluoro-5-trifluoromethoxy-1,3-dioxole-co-tetrafluoroethylene], although those skilled in the art will recognize that other polymers or polymer blends can be used for the lower cladding 22. In an embodiment, lower cladding 22 has a refractive index $n_{clad}$.

In another embodiment the core 24 is a polymer, in another embodiment core 24 is a halogenated polymer from the group of halogens consisting of F, Cl, Br, I, and At, such as a fluoropolymer, and wherein the halogenation is at least 50% by weight, and in certain embodiments, core 24 is a perhalogenated polymer such as a perfluoropolymer. To minimize transmission loss through core 24, core 24 can have a transmission of at least 95% between approximately 1200 and 1700 nanometers. Some examples of polymers include, poly[2,3-(perfluoroalkenyl) perfluorotetrahydrofuran] and poly[2,2,4-trifluoro-5-trifluoromethoxy-1,3-dioxole-co-tetrafluoroethylene]. In another embodiment, the core polymer is substantially free from C=$X_1$ bonds, where $X_1$ is C, S, N, or O, also substantially free from $X_2$—H bonds, where $X_2$ is C, S, N, O, P or Si, and also substantially free from N=O, C≡N, and C≡C bonds. By "substantially free", it is meant that the mole percentage of the elements having such bonds is less than approximately 15%. Certain materials, such as polyimides, acrylates, polyether ketones, and benzocyclobutenes, typically contain such bonds, which generate deleterious vibrational overtones between approximately 1200 and 1700 nanometers and are to be avoided.

In another embodiment, the polymer used for core 24 has a birefringence of less than or equal to about 0.001. Also, the polymer used for core 24 can have an absorptive optical loss of less than approximately $2.5 \times 10^{-4}$ dB/cm in the range from about 1250 to 1700 nm. In other embodiments, the range can be from about 1280 to 1350 nm, 1530 to 1565 nm, or 1565 to 1610 nm. Poly[2,3-(perfluoroalkenyl) perfluorotetrahydrofuran] and poly[2,2,4-trifluoro-5-trifluoromethoxy-1,3-dioxole-co-tetrafluoroethylene] are polymers that meet these requirements, making poly[2,3-(perfluoroalkenyl) perfluorotetrahydrofuran] and poly[2,2,4-trifluoro-5-trifluoromethoxy-1,3-dioxole-co-tetrafluoroethylene] suited for use in core 24.

Also, for gain media and optical amplifier applications, core 24 can be constructed from a perfluoropolymer containing at least one rare earth element from the group consisting of lanthanum, cerium, praseodymium, neodymium, promethium, samarium, europium, gadolinium, terbium, dysprosium, holmium, erbium, thulium, ytterbium, and lutetium. Examples of perfluoropolymers are disclosed in U.S. Pat. No. 6,292,292, and U.S. patent application Ser. No. 09/722,821, filed 28 Nov. 2000; Ser. No. 09/722,282, filed 28 Nov. 2000; and 60/314,902, filed 24 Aug. 2001, which are all owned by the assignee of the present invention and are all incorporated herein by reference in their entireties. However, those skilled in the art will recognize that other polymers containing at least one rare earth element can also be used. Further, core 24 can be a blend of polymers including at least a first polymer containing one of the rare earth elements disclosed above and at least a second polymer, such as the polymer used as lower cladding 22.

In an embodiment, upper cladding 26 is a polymer, in another embodiment upper cladding 26 is a halogenated polymer such as a fluoropolymer, and in certain embodiments, upper cladding 26 is a perhalogenated polymer such as a perfluoropolymer. Also, upper cladding 26 can be the same polymer or polymer blend as lower cladding 22. However, those skilled in the art will recognize that the upper cladding 26 and lower cladding 22 need not necessarily be the same polymer, although upper cladding 26 can have the same, or nearly the same, refractive index $n_{clad}$ as lower cladding 22.

In an embodiment, lower cladding 22, core 24, and upper cladding 26 are spincoated onto substrate 10 to from solution, as is well known by those in the art. Each of lower cladding 22 and upper cladding 26 may be spincoated in multiple layers, depending upon the desired thickness of waveguide 100. After the core layer is spincoated onto the lower cladding layer, the core layer can be etched into core 24 by, for example, reactive ion etching, as is also well known by those skilled in the art.

In an embodiment, lower cladding 22 and upper cladding 26 have a common refractive index $n_{clad}$ and core 24 has a refractive index $n_{core}$ that differs from the refractive index $n_{clad}$ by a small enough amount such that waveguide assembly 100 propagates a light signal in a single mode. Alternatively, lower cladding 22 and upper cladding 26 can have different indicies of refraction. In this case, however, the indicies of refraction for both should be different from the index of refraction of the core by an amount sufficient to allow the core to propagate light. For the case where the cladding layers 22 and 26 are homogeneous, i.e., with a single refractive index $n_{clad}$, the relationship between dimensions of core 24 and $\Delta n$ ($n_{core}-n_{clad}$) is well-captured by the dimensionless V parameter, defined by:

$$V = \frac{2\pi}{\lambda} a \sqrt{\Delta n} \qquad \text{Equation 1}$$

where $\lambda$ is the wavelength, preferably in nanometers, of light to be transmitted through core 24 and a is the width and height of core 24, also preferably in nanometers. The V parameter should be less than 2.5 in order to achieve the single-mode condition. When $\Delta n$ is large, a should be kept small to achieve V<2.5. Such a requirement may result in low optical efficiency coupling to an optical fiber, resulting in undesired signal loss. For a V of 2.5, with $\Delta n$ of approximately 0.04, at a wavelength $\lambda$ of 1550 nanometers, a is approximately 3000 nanometers, or 3 microns.

Although waveguide assembly 100 can be used as an optical amplifier, the waveguide assembly 100 according to the present invention can also be adapted to be an arrayed waveguide grating, a directional coupler, a Mach-Zender interferometer, waveguide Bragg grating, or other optical component in which controlling phase shift of the signal light being transmitted is of concern. For such non-amplification uses, core 24 need not contain the rare earth element as described above.

The wavelength response of phase sensitive polymer waveguide devices is determined by the optical path length nL change over temperature T:

$$\frac{d(nL)}{dT} = \frac{dn}{dT}L + \frac{dL}{dT}n \qquad \text{Equation 2}$$

where n is the refractive index of the polymer waveguide core 24, L is the length of the optical path, which is determined by the linear dimension of substrate 10 at a specific temperature, and T is the temperature of core 24 and substrate 10. Therefore, to achieve athermal devices, the following condition should be satisfied:

$$\frac{dn}{dT}L + \frac{dL}{dT}n = 0 \text{ which yields:} \qquad \text{Equation 3}$$

$$\frac{1}{n}\frac{dn}{dT} = -\frac{1}{L}\frac{dL}{dT} \text{ where } \frac{1}{L}\frac{dL}{dT} = CTE_{substrate} \qquad \text{Equation 4}$$

The coefficient of thermal expansion (CTE) of a given polymer substrate material can be measured by standard thermal mechanical analyzers, which are well known in the art. The refractive index n and the thermo-optic coefficient $$\frac{dn}{dT}$$

of a given polymer waveguide material can be measured as well, by using temperature controlled optical material or optical waveguide measurements, which are also well known in the art. Once the refractive index n and the thermo-optic coefficient $\frac{dn}{dT}$ are determined for a certain waveguide material, the desired CTE can be calculated from Equation 4. However, since waveguide assembly 100 includes lower cladding 22 disposed between substrate 10 and core 24, using the effective index $n_{\it eff}$ provides a more accurate result than by using the refractive index n of core 24 alone. The effective index $n_{\it eff}$ is determined by the refractive index $n_{core}$ of core 24 and the refractive index $n_{clad}$ of cladding 22, and the geometry of the cross-section of core 24. The effective index $n_{\it eff}$ is a number between $n_{core}$ and $n_{clad}$, and tends to closely approximate $n_{core}$ such that, for Equation 4, $n_{core}$ can be used for n.

Polymer materials and blends of polymer materials for substrate 10 can be selected according to their CTE so that, for a given waveguide material, with a specific thermal optical coefficient $\frac{dn}{dT}$ and a specific refractive index n, the athermal condition defined by Equation 4 can be satisfied. If a substrate material with a particular CTE to satisfy Equation 4 is not available based on a selected waveguide core 24, the thermo-optic coefficient $\frac{dn}{dT}$ of core 24 and the thermal expansion coefficient $CTE_{substrate}$ of substrate 10 can be adjusted so that Equation 4 is satisfied. The adjustment can be performed by blending various polymers for substrate 10 and/or the waveguide core 24 to achieve the desired results. Although generally, the equation $$\frac{1}{n}\frac{dn}{dT} = -\frac{1}{L}\frac{dL}{dT},$$

should be satisfied, those skilled in the art will recognize that the results on each side of the equation can differ by approximately 1% and still generally achieve the desired athermal conditions. For polymers, the thermo-optic coefficient is negative in sign, allowing Equation 4 to be satisfied for conventional positive CTF materials.

Table 2, below, provides a list of parameters for various perfluorinated optical waveguide materials and their associated required substrate CTE to achieve athermal conditions.

TABLE 2

|  | poly[2,3-(perfluoroalkenyl) perfluorotetra-hydrofuran] | poly[2,2-bistrifluoromethyl-4,5-difluoro-1,3-dioxole-co-tetrafluoroethylene]-1600 | poly[2,2-bistrifluoromethyl-4,5-difluoro-1,3-dioxole-co-tetrafluoroethylene]-2400 | poly[2,2,4-trifluoro-5-trifluoromethoxy-1,3-dioxole-co-tetrafluoroethylene] |
|---|---|---|---|---|
| CTE (cm/cm/degree Celsius) | $7.4 \times 10^{-5}$ | $7.4 \times 10^{-5}$ | $8.1 \times 10^{-5}$ | $7.4 \times 10^{-5}$ (approx.) |
| Thermo-optic coefficient (dn/dt) | $-8.0 \times 10^{-5}$ (approx.) | $-8.0 \times 10^{-5}$ (approx.) | $-8.0 \times 10^{-5}$ (approx.) | $-8.0 \times 10^{-5}$ (approx.) |
| Refractive index at approximately 1500 nanometers | 1.31 | 1.30 | 1.30 | 1.33 |
| Resultant substrate GTE for athermal waveguide (cm/cm/degree Celsius) | $6.0 \times 10^{-5}$ (approx.) | $6.0 \times 10^{-5}$ (approx.) | $6.0 \times 10^{-5}$ (approx.) | $6.0 \times 10^{-5}$ (approx.) |

Criteria for selecting an appropriate material for substrate 10 may include:
1. CTE that satisfies the athermal condition defined by Equation 3;
2. Suitability for being processed into substrate plates;
3. Compatibility with waveguide formation processing steps; and
4. Compatibility with product reliability requirements.

Table 3, below, lists approximate CTE for various materials suitable for use as substrate 10.

TABLE 3

| Material | CTE ($\times 10^{-4}$ cm/cm/degree Celsius) |
|---|---|
| Polycarbonate | 0.68 |
| Acrylic | 0.68 |
| Polymethyl methacrylate | 0.60–1.30 |
| Cellulosic | 1.10 |
| Polyetherimide | 0.47–0.56 |
| Polyethersulfone | 0.31–0.70 |
| Polyetheretherketone | 0.40–1.08 |
| Polyperfluoroalkoxyethylene | 1.20–1.80 |
| Nylon | 0.50–1.80 |

TABLE 3-continued

| Material | CTE (×10$^{-4}$ cm/cm/degree Celsius) |
| --- | --- |
| Polybenzimidazole | 0.23 |
| Polyester | 1.24 |
| Polyethylene | 1.30–1.70 |
| Polyimide | 0.47–0.56 |
| Polysulfone | 0.56 |
| Polyvinylidene fluoride | 0.70–1.42 |
| Polyacrylonitrile butadiene styrene | 0.65–0.95 |
| Acetal copolymer | 0.85 |

Once the appropriate CTE is identified for a specific waveguide material, substrate 10 can be manufactured using polymers or polymer blends of polymers that exhibit the particular CTE value. For example, referring to Table 2 and poly[2,2-bistrifluoromethyl-4,5-difluoro-1,3-dioxole-co-tetrafluoroethylene]-2400, which requires a resultant substrate CTE of approximately 6.0×10$^{-5}$ cm/cm/degree Celsius, a material listed in Table 2 which satisfies the requirement is Polyethersulfone, with a CTE of between 0.31 and 07.0× 10$^{-4}$ cm/cm/degree Celsius.

In another embodiment, a substrate can be selected for particular desired properties and a comparable waveguide material can be determined based on its thermal optical coefficient $$\frac{dn}{dT}$$

and refractive index n, such that the athermal condition defined by Equation 4 can be satisfied.

The substrate 10 can be manufactured by at least one of various methods, such as extrusion, injection molding, stamping, dicing, etc., all of which are known to those skilled in the art. Subsequently, the polymer waveguide 20 is fabricated on substrate 10 by various methods of waveguide manufacture, which are known to those skilled in the art.

Figure 3:
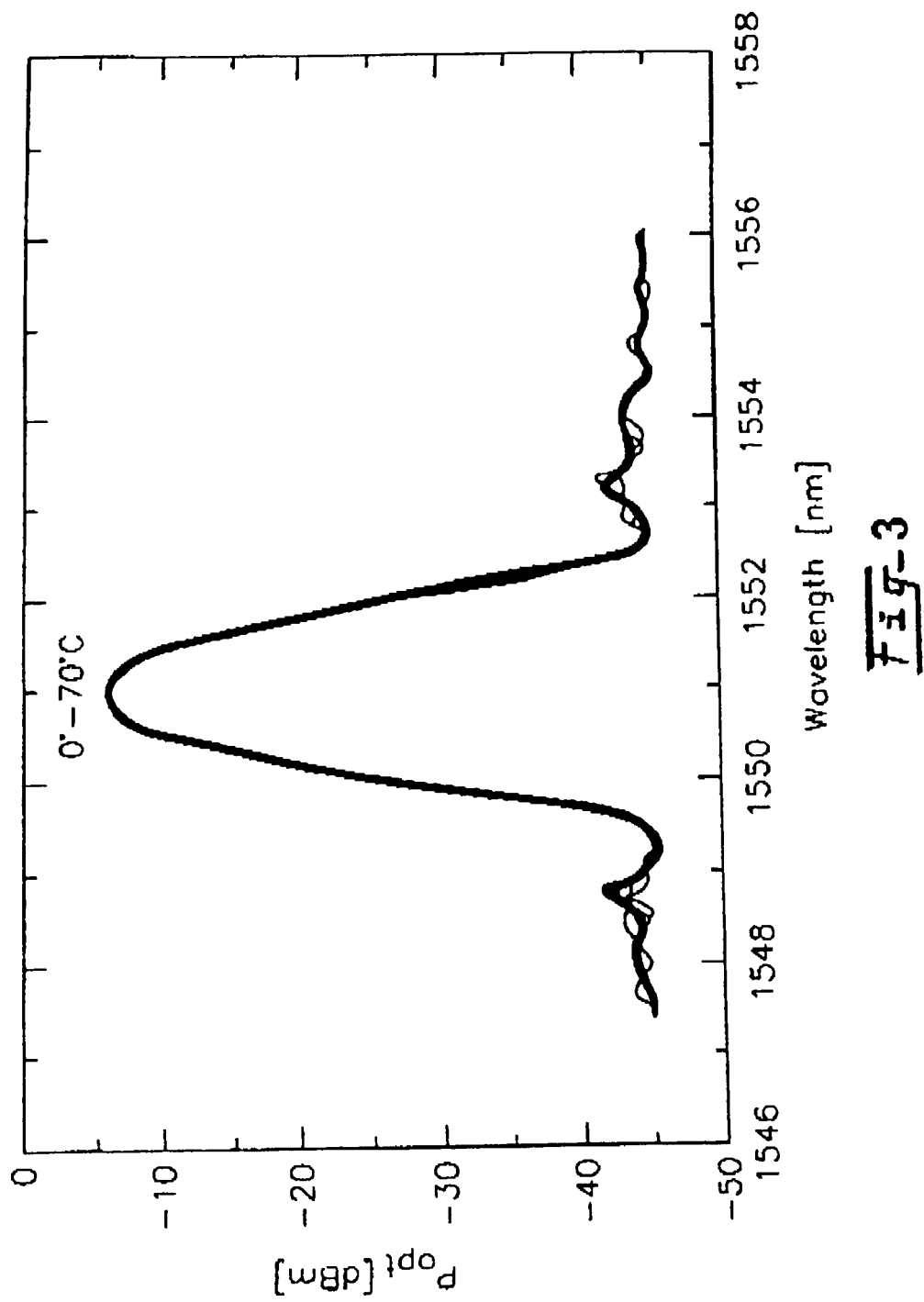
FIG. 3 is a graph showing wavelength shift as a function of temperature for an optical waveguide constructed according to the first embodiment of the present invention.

FIG. 3 shows a graph of devices according to an embodiment of the present invention where temperature is varied from 0 degrees Celsius though 70 degrees Celsius for a waveguide assembly 100 manufactured according to the present invention. In the example, core 24 can have a refractive index $n_{core}$ of 1.34 and claddings 22 and 26 can have a refractive index $n_{clad}$ of 1.313. In comparing FIG. 3 to FIG. 1, one can readily see the absence of phase shifting as a result of temperature variation.

In an embodiment, waveguide 100 is connected to input and output fibers as shown and described in U.S. Provisional Patent Application Ser. No. 60/322,163, filed on 14 Sep. 2001, which is owned by the assignee of the present invention, and is incorporated herein by reference in its entirety. Alternatively, input and output fibers can be connected to the waveguide 100 through the use of capillary tubes, as is well known by those skilled in the art.

Figure 4:
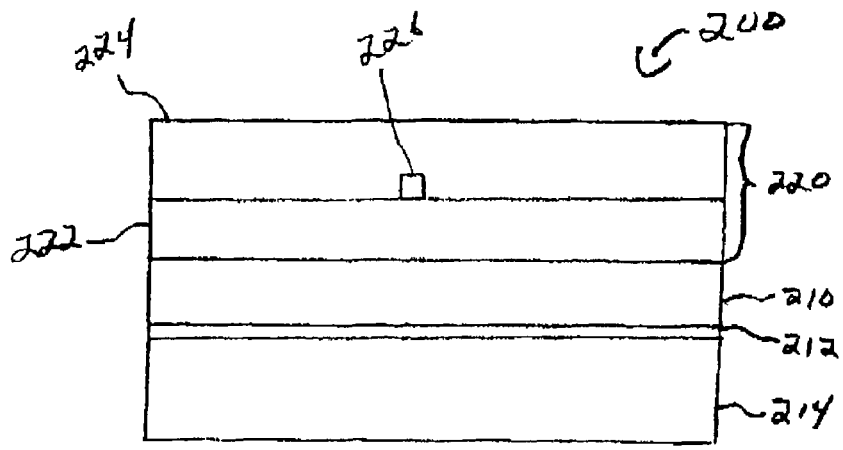
FIG. 4 is an end view of a film adhered to a first substrate for a second embodiment of the present invention.
Figure 5:
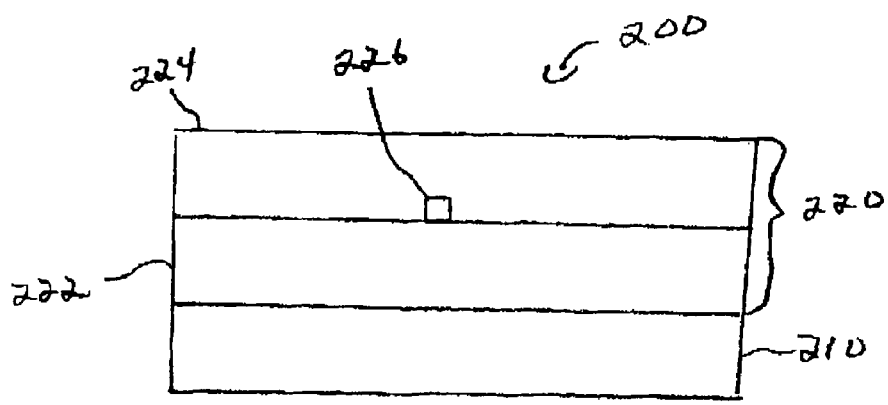
FIG. 5 is an end view of the optical waveguide of FIG. 4, with the first substrate and the adhesive removed.
Figure 6:
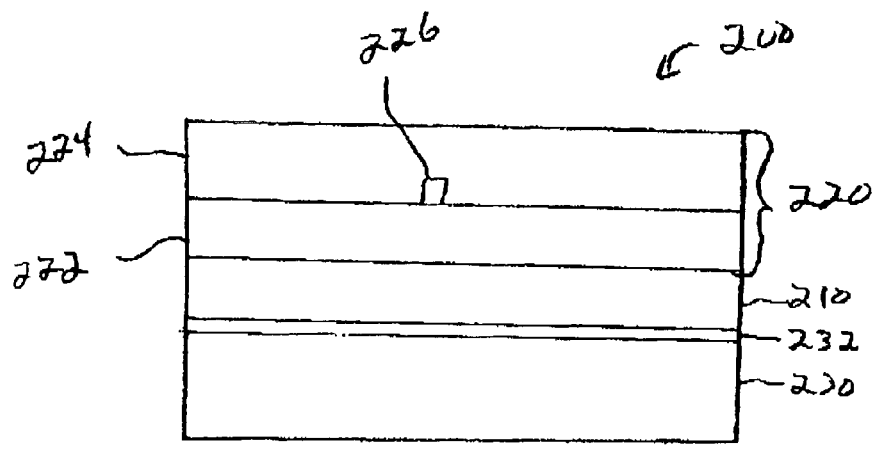
FIG. 6 is an end view of the optical waveguide of FIG. 5, with a second substrate adhered to the waveguide.

FIGS. 4–6 illustrate another embodiment of an athermal polymer waveguide 200. Referring to FIG. 4, a thin film 210 with good thermal stability (e.g. glass transition temperature greater than 200 degrees Celsius), such as polyimide, is bonded by a temporary adhesive 212 on top of a temporary substrate 214 that satisfies conditions 2) and 3) of paragraph [0055] above. The adhesive 212 can be epoxy, or any other, suitable adhesive, as will be recognized by those skilled in the art. The thickness of thin film 210 ranges approximately between 10 and 200 micrometers, and the thickness of temporary substrate 214 ranges approximately between 0.5 and 5 millimeters. A polymer waveguide structure 220 is formed on top of the thin film using standard photolithography and etching processes as disclosed in U.S. patent application Ser. No. 10/045,317, filed on 7 Nov. 2001, which is owned by the assignee of the present invention, and is incorporated herein by reference in its entirety. The waveguide 220 shown in FIG. 4 reflects a lower cladding layer 222 and an upper cladding layer 224 surrounding a core 226.

Next, referring to FIG. 5, the polyimide thin film 210 with the polymer waveguide 220 is peeled away from substrate 214 and temporary adhesive 212 is cleaned from the back of polyimide thin film 210 by a solvent that dissolves temporary adhesive 212 but does not dissolve polyimide thin film 210 and polymer waveguide 220. An example of such a solvent is any solvent suitable for dissolving epoxy, as will be recognized by one skilled in the art. Next, as shown in FIG. 6, polyimide film 210 is permanently attached to second, or permanent, substrate 230 that satisfies athermal conditions 1) through 4) of paragraph [0055] above. A permanent adhesive 232 is used to bond permanent substrate 230 to polyimide film 210. The permanent adhesive 232 can be epoxy, or any other, suitable adhesive, as will be recognized by those skilled in the art. The permanent substrate 230 has a thickness much larger than the thickness of the polyimide film 210 and the waveguide 220, e.g. 1–5 millimeters. As polyimide film 210 with the polymer waveguide 220 on it is bonded together with permanent substrate 230, the thermal expansion coefficient of permanent substrate 230 will dominate polymer waveguide 220/polyimide film 210/permanent substrate 230 composite thermal expansion properties, as substrate 230 is much thicker than polyimide film 210 and waveguide 220. The substrate 230 can be chosen based on its CTE and reliability performances, and can be selected from the group listed above in paragraph [0041].

Figure 7:
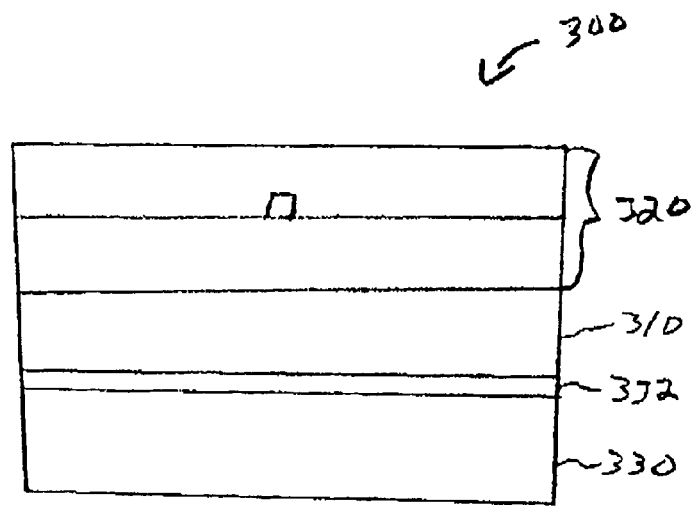
FIG. 7 is an end view of a third embodiment of the present invention, with a second substrate adhered to a first substrate.

In another embodiment there is an athermal polymer optical waveguide 300 there is an athermal device substrate 310 and a method of forming substrate 310 that conform to conditions 1) through 4) of paragraph [0055], but is easily adjusted. Referring to FIG. 7, a polymer waveguide device 320 is formed on a first substrate 310. Next, the first substrate 310 is bonded to a secondary substrate 330 via a permanent adhesive 332. Although only one secondary substrate 330 is shown, those skilled in the art will recognize that more than one secondary substrate 330 can be used. The composite of first substrate 310 and the subsequent layers of substrates 330 are used to determine the compound CTE on the top surface of first substrate 310. The compound CTE can be adjusted by changing the composition and the thickness of the different substrates 310 and 330 so that Equation 3 is satisfied.

Figure 8:
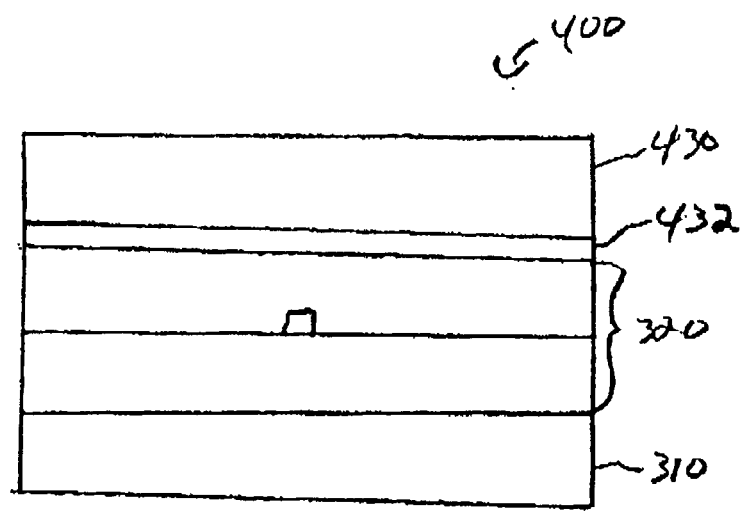
FIG. 8 is an end view of a fourth embodiment of the present invention, with a superstrate disposed on top of the waveguide.

FIG. 8 illustrates a fourth embodiment of an athermal polymer optical waveguide 400. The polymer waveguide device 320 is formed on the first substrate 310, and a superstrate 430 is bonded to the top of the waveguide 320 with a permanent adhesive 432, such that the core is disposed between the first substrate 310 and the superstrate 430. The combination of the first substrate 310 and the superstrate 430 determine the compound CTE for the first substrate 310 and the superstrate 430. The compound CTE can be adjusted by changing the composition and the thickness of the first substrate 310 and the superstrate 430 so that equation 3 is satisfied.

Figure 9:
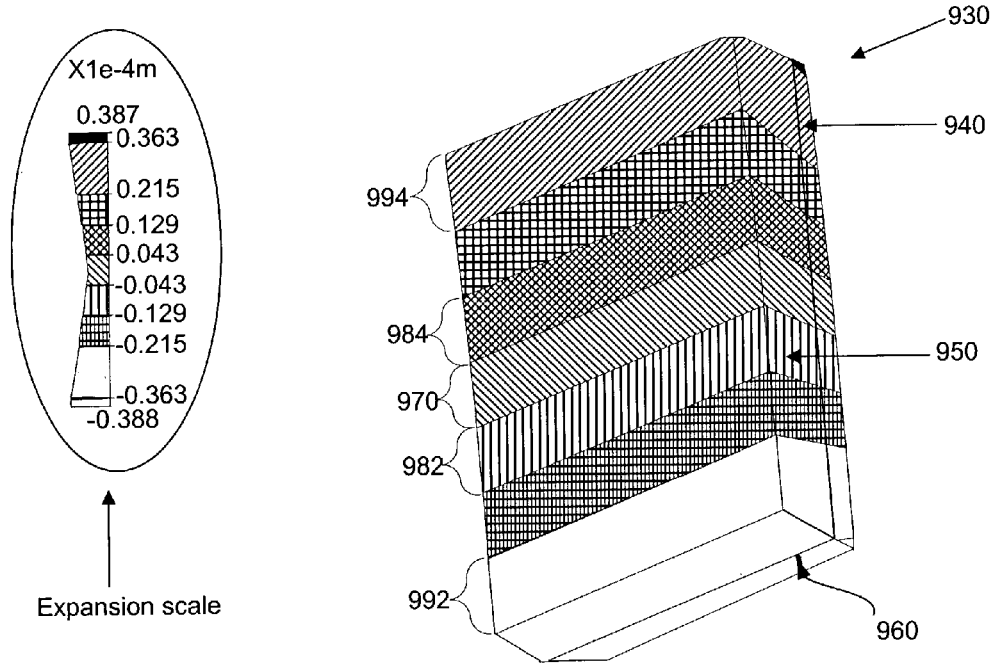
FIG. 9 is a perspective cross-sectional view of an exemplary device having a substrate, superstrate, and waveguide layers.

FIG. 9 shows an exemplary embodiment of the present invention. Shown is a perspective cross-section of a device 930. Device 930 includes a substrate layer 940 and a superstrate layer 950. Between substrate layer 930 and superstrate layer 950 are a series of waveguide layers 960. The waveguide layers conform to the embodiments of the invention disclosed herein and include a lower cladding layer, a core layer, and an upper cladding layer. Although the waveguide layers 960 include multiple layers, FIG. 9 shows the series of waveguide layers 960 as a single layer represented by a solid line because the series of layers are thin as compared to the thickness of substrate 940 and superstrate 950. In an embodiment, the thickness of superstrate 950 is of the same order of magnitude as the thickness of substrate 940, however, in other embodiments this may not be the case.

FIG. 9 shows how the material of device 930 expands as a result of a change of temperature. For example, section 970 can be selected as a reference point on device 930. As the temperature of device 930 changes, sections away from section 970 (i.e., vertical in FIG. 9) may expand according to the scale shown on the left of the figure. Specifically, in the example shown in FIG. 9, as the temperature increases by 40° C., sections 982 and 984 may expand away from section 970 by an absolute amount of $0.129 \times 10^{-4}$ m. Similarly, sections 992 and 994 may expand away from section 940 by an absolute amount of $0.363 \times 10^{-4}$ m.

Figure 10:
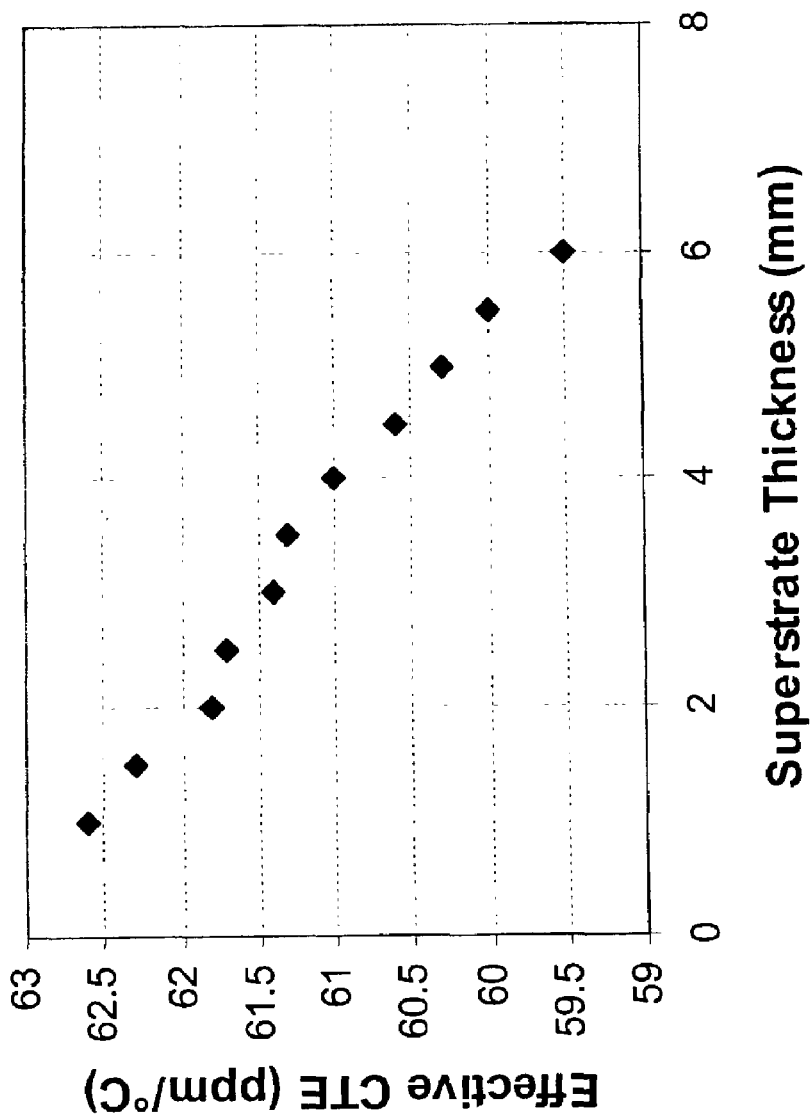
FIG. 10 is a graph showing the relationship between superstrate thickness and effective CTE.

The effective CTE, which correspond to the expansion at the waveguide layers, can be tuned by varying different parameters of the materials of device 930. For example, FIG. 10 shows a graph of the relationship between superstrate thickness in mm and effective CTE measured in ppm/° C. (parts per million/° C.). In the example of FIG. 10, the substrate is set to have a thickness of 1.5 mm. As shown, varying the thickness of the superstrate changes the effective CTE. Accordingly, embodiments of the present invention can tune the effective CTE by varying the thickness of the superstrate. Further, the effective CTE can be calculated using the Young's modulus, CTE, and the thickness of the substrate and superstrate.

The following example describes a waveguide 100 according to an embodiment of the present invention:

EXAMPLE

Substrate: polycarbonate, approximately 0.75 millimeters thick;

Lower cladding: poly[2,2,4-trifluoro-5-trifluoromethoxy-1,3-dioxole-co-tetrafluoroethylene], approximately 8–15 microns thick;

Core: poly[2,3-(perfluoroalkenyl) perfluorotetrahydrofuran], approximately 4 microns thick. RIE to form core having dimensions of 4 microns wide×4 microns thick;

Upper cladding: poly[2,2,4-trifluoro-5-trifluoromethoxy-1,3-dioxole-co-tetrafluoroethylene], approximately 8–15 microns thick;

Device manufactured: arrayed waveguide grating (AWG).

Figure 11:
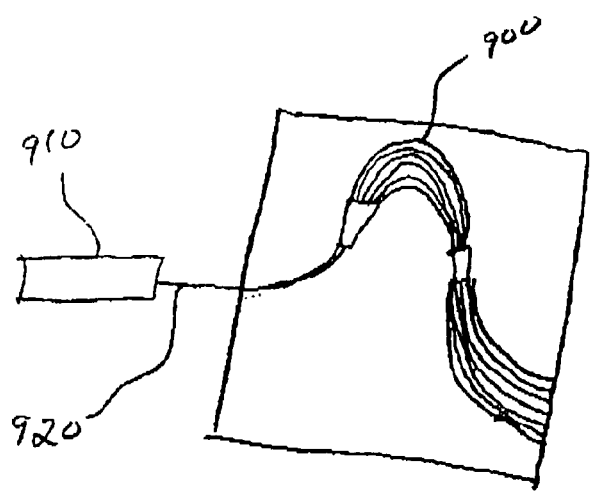
FIG. 11 is a plan view of a test set-up for an AWG consistent with the present invention.

Referring to FIG. 11, an AWG 900, manufactured according to the first embodiment waveguide 100 described immediately above, was connected to a signal light source 910 by a 2 meter long glass fiber 920. The signal light source 910 was a tunable External Cavity Laser (ECL), which generates up to an 8 mW signal light at between approximately 1520–1620 nm. The fiber was pigtailed to the input of the AWG 900. An insertion loss of less than 5 dB was measured on an Optical Spectrum Analyzer (OSA) 930, which was pigtailed to an output of the AWG 900. Crosstalk between adjacent channels was measured at approximately 20 dB. Various temperature ramp profiles were used by inserting the AWG 900 in an environmental chamber (not shown) and ramping the temperature inside the chamber. Examples of temperature ramps were 1 degree Celsius per minute from 0 to 80 degrees Celsius, as well as 1 degree Celsius per 10 minutes from 0 to 80 degrees Celsius.

Figure 12:
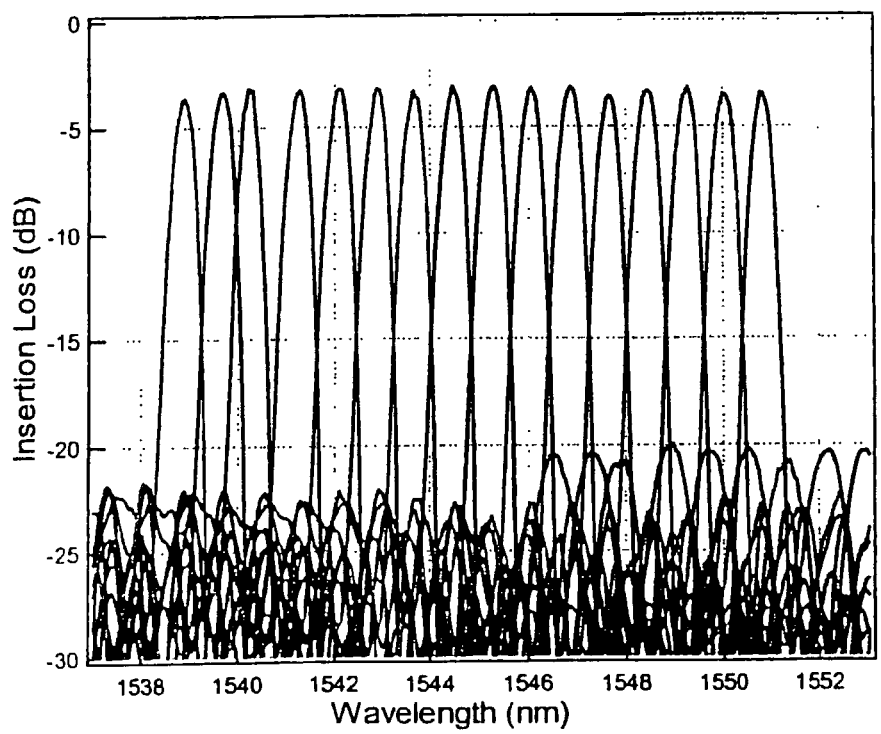
FIG. 12 is a graph showing the measured fiber to fiber transmission spectra for an exemplary embodiment.

After the AWG is fabricated, the AWG chip can be pigtailed with a high numerical aperture (NA) fiber with a mode field diameter matched to the AWG. In an example, the spectral transmission characteristics of the pigtailed AWG according to an embodiment of the present invention were measured with a tunable laser and an optical spectrum analyzer. FIG. 12 illustrates the measured fiber to fiber transmission spectra. The crosstalk level is about −20±2 dB, and the insertion loss is about 3±0.3 dB. The polarization shift is less than 0.1 nm.

Figure 13:
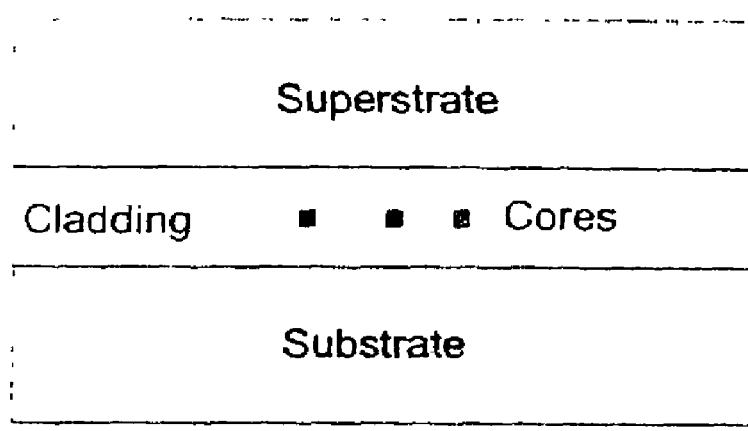
FIG. 13 is a schematic diagram of athermal polymer superstrate overlay configuration.

FIG. 13 shows a schematic diagram of the superstrate overlay configuration for achieving athermal performance. The wavelength shift as a function of temperature can be represented by the relation:

$$\frac{d\lambda}{dT} = \left(\frac{\lambda}{n}\right)\left(\frac{dn}{dT} + n \cdot \alpha\right),$$

where λ is wavelength, T temperature, n effective index of the waveguide, and α thermal expansion coefficient experienced by the wavelength array section within the AWG device. The athermal condition is:

$$\frac{dn}{dT} + n \cdot \alpha = 0.$$

Figure 14:
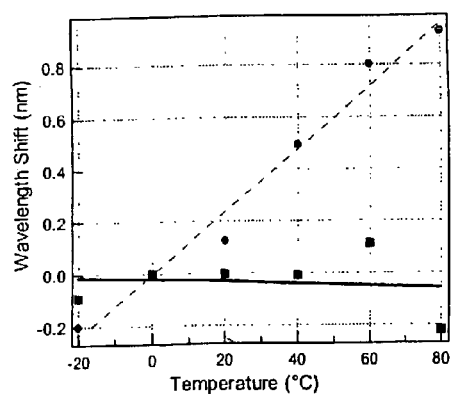
FIG. 14 is a graph showing the temperature dependence of an athermal wavelength shift with and without a superstrate for an exemplary embodiment.

In an embodiment where thin waveguide layers are placed on top of a substantially thicker substrate, the substrate CTE dictates the value of α. As shown in FIG. 14, the dotted line is a device not including a superstrate. In this case, the temperature dependence of an exemplary configuration for the perfluoropolymer AWG on a polymer substrate is 12±0.4 pm/° C. (picometer/° C.), which is essentially the same as the silicon-on-silicon value. Placing a polymer superstrate with a lower thermal expansion coefficient over a substrate and adjusting the superstrate thickness, the value of α can be fine-tuned so that the athermal condition is satisfied. The solid line of FIG. 14 shows an exemplary graph of the temperature dependence of an exemplary AWG according to an embodiment of the present invention using a superstrate. In the example, the channel wavelength shift is reduced to −0.5±0.4 pm/° C. over a wide range of temperatures. Further, the superstrate can be chosen from a large variety of materials since it need not meet the requirements of the waveguide substrate, such as surface smoothness and stability under device fabrication conditions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A planar optical waveguide comprising:

a polymer substrate comprising a surface modified by reactive ion etching, wherein the polymer substrate has a coefficient of thermal expansion;

a first cladding disposed on the substrate; and a core disposed on at least a portion of the first cladding, wherein the core is a halogenated polymer, wherein the halogenated polymer has an absence of deleterious vibrational overtones between approximately 1200 and 1700 nanometers, and wherein the core has a thermo-optic coefficient and a refractive index, a product of the thermo-optic coefficient and the reciprocal of the refractive index being approximately equal to the negative of the coefficient of thermal expansion.

2. A planar optical waveguide comprising:

a polymer substrate having a coefficient of thermal expansion;

a first cladding disposed on the substrate;

a core disposed on at least a portion of the first cladding, the core being a halogenated polymer, wherein the halogenated polymer has a transmission of about 95% or more per centimeter between appromixately 1200 and 1700 nanometers, and wherein the core has a thermo-optic coefficient and a refractive index, a product of the thermo-optic coefficient and the reciprocal of the refractive index being approximately equal to the negative of the coefficient of thermal expansion; and a polymer superstrate disposed over the first cladding layer.

* * * * *